(12) United States Patent
Dorn et al.

(10) Patent No.: US 11,806,630 B1
(45) Date of Patent: Nov. 7, 2023

(54) PROFILE-BASED DETECTION OF UNINTENDED CONTROLLER ERRORS

(71) Applicants: SONY INTERACTIVE ENTERTAINMENT LLC, San Mateo, CA (US); SONY INTERACTIVE ENTERTAINMENT INC., Tokyo (JP)

(72) Inventors: Victoria Dorn, San Mateo, CA (US); Celeste Bean, San Mateo, CA (US); Elizabeth Juenger, San Mateo, CA (US); Kristie Ramirez, San Mateo, CA (US); Sepideh Karimi, San Mateo, CA (US); Mahdi Azmandian, San Mateo, CA (US)

(73) Assignees: SONY INTERACTIVE ENTERTAINMENT LLC, San Mateo, CA (US); SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 17/828,683

(22) Filed: May 31, 2022

(51) Int. Cl.
*A63F 13/79* (2014.01)
*A63F 13/22* (2014.01)

(52) U.S. Cl.
CPC .............. *A63F 13/79* (2014.09); *A63F 13/22* (2014.09); *A63F 2300/1018* (2013.01)

(58) Field of Classification Search
None
See application file for complete search history.

(56) References Cited

U.S. PATENT DOCUMENTS

| 2005/0113158 | A1* | 5/2005 | Sterchi ................... A63F 13/10 463/3 |
| 2006/0287023 | A1* | 12/2006 | Yokoyama ............ A63F 13/573 463/3 |
| 2011/0306395 | A1 | 12/2011 | Ivory et al. |
| 2012/0262407 | A1 | 10/2012 | Hinckley et al. |
| 2018/0243656 | A1 | 8/2018 | Aghdaie et al. |
| 2019/0099676 | A1 | 4/2019 | Bostick et al. |

(Continued)

FOREIGN PATENT DOCUMENTS

WO  WO 2018/154327  8/2018

OTHER PUBLICATIONS

PCT Application No. PCT/US23/20722, International Search Report dated Jul. 21, 2023.

(Continued)

*Primary Examiner* — Jason T Yen
(74) *Attorney, Agent, or Firm* — Polsinelli LLP (57) ABSTRACT

Methods of the present disclosure may also identify when certain users perform well at certain activities and perform poorly when performing other activities. A particular user could perform very well at a swimming game yet perform poorly at the first-person shooter game. This performance difference may be based on a physical impairment, be based on a lack of training, or be based on other factors. When a potential performance deficiency is identified, a user may be provided with a set of selections that allow the user to participate in a training session or that may allow the user to change functions of a gaming controller to account for the apparent performance deficiency. This additional training or change in controller functions may allow a user to have a more enjoyable user experience or may allow the user to perform at a higher level.

21 Claims, 5 Drawing Sheets

(56) References Cited

U.S. PATENT DOCUMENTS

| | | | |
|---|---|---|---|
| 2021/0086083 A1 | 3/2021 | Aghdaie et al. | |
| 2021/0187398 A1 | 6/2021 | Nair et al. | |
| 2021/0400142 A1* | 12/2021 | Jorasch | H04M 3/567 |
| 2022/0308667 A1* | 9/2022 | Croxford | G05B 13/027 |

OTHER PUBLICATIONS

PCT Application No. PCT/US23/20723, International Search Report dated Jul. 21, 2023.

* cited by examiner

PROFILE-BASED DETECTION OF UNINTENDED CONTROLLER ERRORS

BACKGROUND OF THE INVENTION

1. Field of the Disclosure

The present disclosure is generally related to detecting and responding to anomalies associated with the use of a game controller. More specifically, the present disclosure is directed to assisting users improve their use of a game controller such that those users may have a more enjoyable user experience.

2. Description of the Related Art

Computer gaming began many years ago with simple games like Pong where two users used simple control inputs to play a game similar to table tennis. Since then, many different games and gaming controllers have been developed to provide users with a more enriching experience and the ability to control actions performed by a gaming computer with increased sophistication. Computer gaming now has developed to the point where individuals use complex controllers. Some gaming systems offer users with a virtual environment where the users may be immersed fully immersed in a game.

Computer gaming systems receive and interpret commands input by a user. Commonly, these systems require the user to provide inputs in a timely and correct manner. In such systems, when a user enters a control input, the gaming system performs actions based on that input even when a particular input results in the user performing poorly when playing a game or a particular type of game.

When users make errors when using a game controller, those errors may be made based on the user not being familiar with a particular game or these errors may be made based on a physical impairment of the user. As such, errors may be caused when a user is confused, memory-impaired, physically impaired, or is impaired in some other way. Such users, after they make numerous errors may simply get frustrated and stop playing that game when these errors impact the performance of the user's game play. In order to increase user satisfaction and improve user experiences, new and improved methods and systems are needed.

SUMMARY OF THE CLAIMED INVENTION

The presently claimed invention relates to a method, a non-transitory computer readable storage medium, or an apparatus executing functions consistent with the present disclosure for helping users improve their performance when playing a game. In a first embodiment, a method consistent with the present disclosure may include the steps of collecting a set of user input data received from a game controller and timing information when a game is being played by a user, monitoring data associated with performance of the game when the game is played by the user to identify an undesired game outcome and a time associated with the undesired game outcome, and performing an analysis that compares the received game controller input data and timing information with the time of the undesired game outcome when identifying a set of selections to provide the user. The presently claimed method may also include the steps of providing the set of selections to the user based on the analysis and receiving a selection of the set of selections such that an action identified in the selection can be initiated. The action may then be initiated after receipt of the selection.

In a second embodiment, the method may be implemented as a non-transitory computer-readable storage medium where a processor executes instructions out of the memory. Here again the method may include collecting a set of user input data received from a game controller and timing information when a game is being played by a user, monitoring data associated with performance of the game when the game is played by the user to identify an undesired game outcome and a time associated with the undesired game outcome, and performing an analysis that compares the received game controller input data and timing information with the time of the undesired game outcome when identifying a set of selections to provide the user. This method may also include providing the set of selections to the user based on the analysis and receiving a selection of the set of selections such that an action identified in the selection can be initiated. The action may then be initiated after receipt of the selection.

DETAILED DESCRIPTION

Methods of the present disclosure help improve experiences of users when those users interact with a gaming system using a game controller. These methods may create a user profile that includes information associated with specific users and with their ability to play certain types of games. When a user plays a game, they may provide input that results in the user experiencing a negative outcome. For example, a user that plays a first-person shooter game may provide commands that result in a game character missing a target that they where apparently shooting at. Here a user profile may associate this particular user with a propensity to miss targets in the game. Such outcomes may be rooted in the fact that the user has difficulty in aligning a virtual weapon with a target. This could be the result of the user forcefully depressing a trigger or other input of a game controller. Much like real shooting, users should gently squeeze a trigger instead of forcefully depressing the trigger. Such errors could also be the result of a physical impartment, for example, a user may not be able to consistently squeeze the trigger because of arthritis in their hands. When errors are detected, or when a pattern of errors is detected, methods of the present disclosure may provide instructions to the user or the user may be offered with an opportunity to practice shooting at virtual targets.

Methods of the present disclosure may also identify when certain users perform well at certain activities and perform poorly when performing other activities. A particular user could perform very well at a swimming game yet perform poorly at the first-person shooter game. This performance difference may be based on a physical or mental impairment, be based on a lack of training, or be based on other factors. When a potential performance deficiency is identified, a user may be provided with a set of selections that allow the user to be provided with training content (e.g., overlay or other informational notification), participate in a training session or that may allow the user to change functions of the same or different gaming controller (e.g., button mapping) to account for the apparent performance deficiency. This additional training or change in controller functions may allow a user to have a more enjoyable user experience or may allow the user to perform at a higher level.

When a user participates at a higher level at one type of a game (e.g., a swimming game) than a second type of game (e.g. a first-person shooter game), control buttons typically used to control the swimming game that are different than the first-person shooter game may help identify that the user has an impaired finger. Such an identification may result in the gaming system providing a suggestion to the user to use their middle finger instead of their index finger to activate the trigger of the first-person shooter game. In such an instance, the index finger of the user may be impaired where the middle finger of the user is not impaired.

Methods of the present disclosure may use a form of machine learning or artificial intelligence to identify errors made by a particular user or patterns of behavior associated with that particular user. This may result in a profile of that user being updated as the user play a game. Training content may be provided during the current session (e.g., in an overlay), or the current session may be paused while the user reviews the training content and/or practices a virtual action during a training session. In other implementations, corrective action suggestions may be presented, and additional data collection may provide the user with improved and customized tools to perform better at a particular game. The success of the user's subsequent interactive performance (e.g., in performing the intended virtual action at the right time) may also be tracked and used to refine what options are provided to the user.

Figure 1:
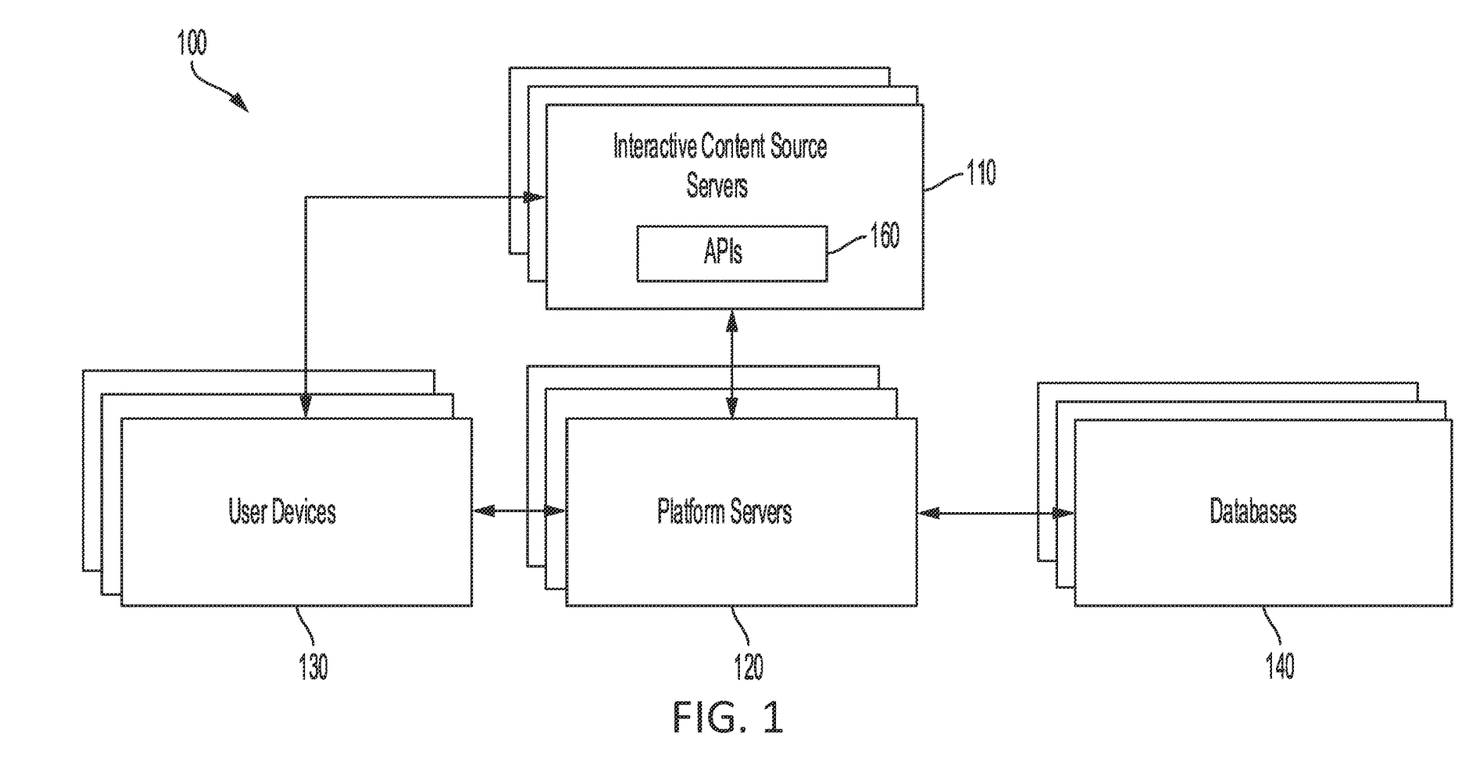
FIG. 1 illustrates a network environment in which a system for profile-based detection of unintended controller usage may be implemented.

FIG. 1 illustrates a network environment in which a system for profile-based detection of unintended controller usage may be implemented. The network environment 100 may include one or more interactive content servers 110 that provide streaming content (e.g., interactive video, podcasts, etc.), one or more platform servers 120, one or more user devices 130, and one or more databases 140.

Figure 2:
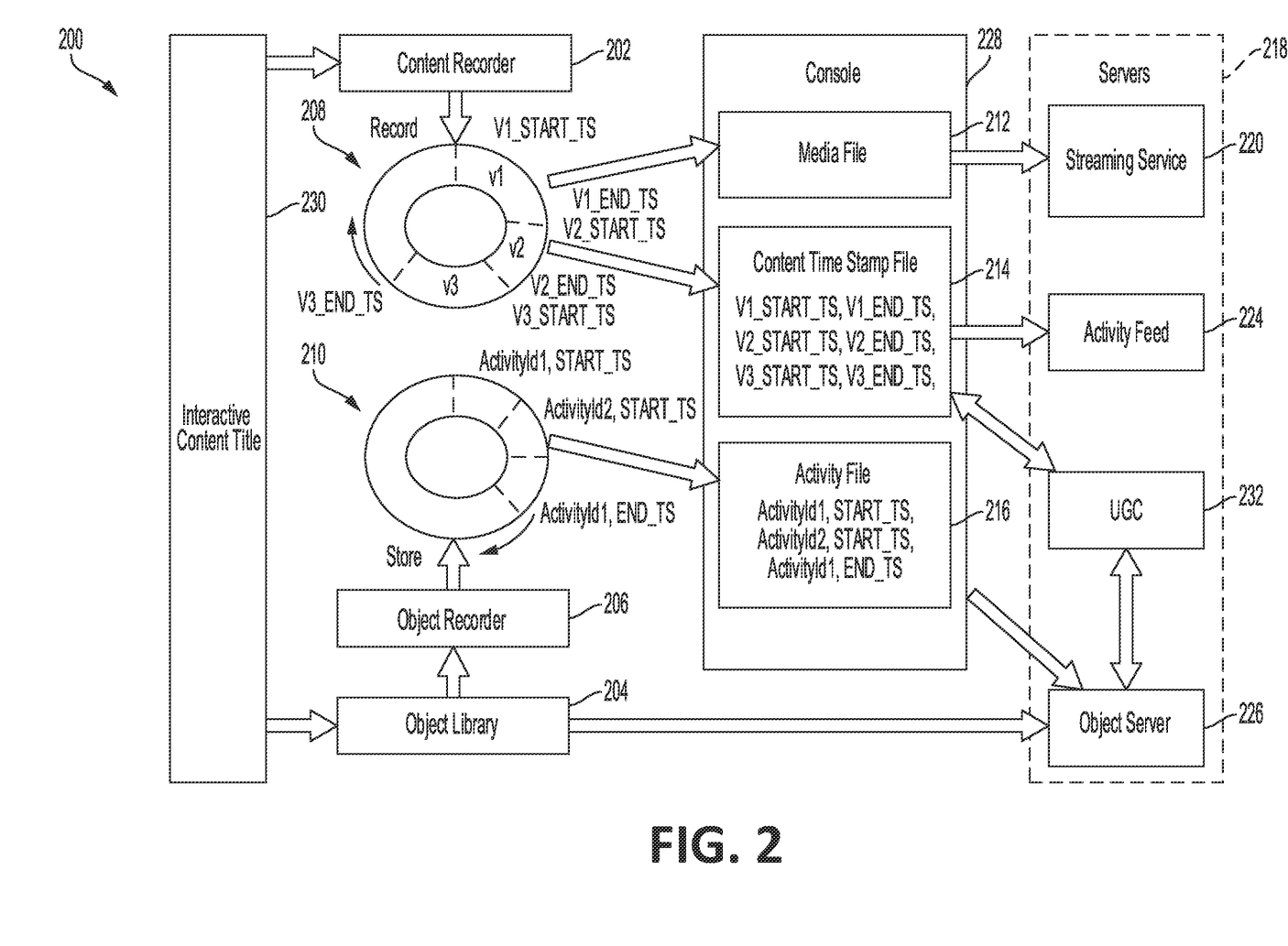
FIG. 2 illustrates an exemplary uniform data system (UDS) that may be used to provide data to a system for profile-based detection of unintended controller usage.

Interactive content servers 110 may maintain, stream, and host interactive media available to stream on a user device 130 over a communication network. Such interactive content servers 110 may be implemented in the cloud (e.g., one or more cloud servers). Each media may include one or more sets of object data that may be available for participation with (e.g., viewing or interacting with an activity) by a user. Data about the object shown in the media may be stored by the media streaming servers 110, platform servers 120 and/or the user device 130, in an object file 216 ("object file"), as will be discussed in detail with respect to FIGS. 2A and 3.

The platform servers 120 may be responsible for communicating with the different interactive content servers 110, databases 140, and user devices 130. Such platform servers 120 may be implemented on one or more cloud servers. The streaming servers 110 may communicate with multiple platform servers 120, though the media streaming servers 110 may be implemented on one or more platform servers 120. The platform servers 120 may also carry out instructions, for example, receiving a user request from a user to stream streaming media (i.e., games, activities, video, podcasts, User Generated Content ("UGC"), publisher content, etc.) and computer gaming. The platform servers 120 may further carry out instructions, for example, for streaming the streaming media content titles. Such streaming media may have at least one object set associated with at least a portion of the streaming media. Each set of object data may have data about an object (e.g., activity information, zone information, actor information, mechanic information, game media information, etc.) displayed during at least a portion of the streaming media.

The streaming media and the associated at least one set of object data may be provided through an application programming interface (API) 160, which allows various types of media streaming servers 110 to communicate with different platform servers 120 and different user devices 130. API 160 may be specific to the particular computer programming language, operating system, protocols, etc., of the media streaming servers 110 providing the streaming media content titles, the platform servers 120 providing the media and the associated at least one set of object data, and user devices 130 receiving the same. In a network environment 100 that includes multiple different types of media streaming servers 110 (or platform servers 120 or user devices 130), there may likewise be a corresponding number of APIs 160.

The user device 130 may include a plurality of different types of computing devices. For example, the user device 130 may include any number of different gaming consoles, mobile devices, laptops, and desktops. In another example, the user device 130 may be implemented in the cloud (e.g., one or more cloud servers). Such user device 130 may also be configured to access data from other storage media, such as, but not limited to memory cards or disk drives as may be appropriate in the case of downloaded services. Such devices 130 may include standard hardware computing components such as, but not limited to network and media interfaces, non-transitory computer-readable storage (memory), and processors for executing instructions that may be stored in memory. These user devices 130 may also run using a variety of different operating systems (e.g., iOS, Android), applications or computing languages (e.g., C++, JavaScript). An example of a user device 130 is a computer gaming console.

The databases 140 may be stored on the platform server 120, the media streaming servers 110, any of the servers 218 (shown in FIG. 2), on the same server, on different servers, on a single server, across different servers, or on any of the user devices 130. Such databases 140 may store the streaming media and/or an associated set of object data. Such streaming media may depict one or more objects (e.g., activities) that a user can participate in and/or UGC (e.g., screen shots, videos, commentary, mashups, etc.) created by peers, publishers of the media content titles and/or third party publishers. Such UGC may include metadata by which to search for such UGC. Such UGC may also include information about the media and/or peer. Such peer information may be derived from data gathered during peer interaction with an object of an interactive content title (e.g., a video game, interactive book, etc.) and may be "bound" to and stored with the UGC. Such binding enhances UGC as the UGC may deep link (e.g., directly launch) to an object, may provide for information about an object and/or a peer of the UGC, and/or may allow a user to interact with the UGC. One or more user profiles may also be stored in the databases 140. Each user profile may include information about the user (e.g., user progress in an activity and/or media content title, user id, user game characters, etc.) and may be associated to media.

FIG. 2 illustrates an exemplary uniform data system (UDS) that may be used to provide data to a system for profile-based detection of unintended controller usage. Based on data provided by UDS, a gaming server can be made aware of what in-game objects, entities, activities, and events that users have engaged with, and thus support analysis of and coordination with in-game activities. Each user interaction may be associated the metadata for the type of in-game interaction, location within the in-game environment, and point in time within an in-game timeline, as well as other players, objects, entities, etc., involved. Thus, metadata can be tracked for any of the variety of user interactions that can occur in during a game session, including associated activities, entities, settings, outcomes, actions, effects, locations, and character stats. Such data may further be aggregated, applied to data models, and subject to analytics. Such a UDS data model may be used to assign contextual information to each portion of information in a unified way across games.

As illustrated in FIG. 2, an exemplary console 228 (e.g., a user device 130) and exemplary servers 218 (e.g., streaming server 220, an activity feed server 224, a user-generated content (UGC) server 232, and an object server 226) are shown. In one example, the console 228 may be implemented on the platform server 120, a cloud server, or on any of the servers 218. In an exemplary example, a content recorder 202 may be implemented on the platform server 120, a cloud server, or on any of the servers 218. Such content recorder 202 receives and records content (e.g., media) from an interactive content title 230 onto a content ring-buffer 208. Such ring-buffer 208 may store multiple content segments (e.g., v1, v2 and v3), start times for each segment (e.g., V1_START_TS, V2_START_TS, V3_START_TS), and end times for each segment (e.g., V1_END_TS, V2_END_TS, V3_END_TS). Such segments may be stored as a media file 212 (e.g., MP4, WebM, etc.) by the console 228. Such media file 212 may be uploaded to the streaming server 220 for storage and subsequent streaming or use, though the media file 212 may be stored on any server, a cloud server, any console 228, or any user device 130. Such start times and end times for each segment may be stored as a content time stamp file 214 by the console 228. Such content time stamp file 214 may also include a streaming ID, which matches a streaming ID of the media file 212, thereby associating the content time stamp file 214 to the media file 212. Such content time stamp file 214 may be uploaded and stored to the activity feed server 224 and/or the UGC server 232, though the content time stamp file 214 may be stored on any server, a cloud server, any console 228, or any user device 130.

Concurrent to the content recorder 202 receiving and recording content from the interactive content title 230, an object library 204 receives data from the interactive content title 230, and an object recorder 206 tracks the data to determine when an object beings and ends. The object library 204 and the object recorder 206 may be implemented on the platform server 120, a cloud server, or on any of the servers 218. When the object recorder 206 detects an object beginning, the object recorder 206 receives object data (e.g., if the object were an activity, user interaction with the activity, activity ID, activity start times, activity end times, activity results, activity types, etc.) from the object library 204 and records the activity data onto an object ring-buffer 210 (e.g., ActivityID1, START_TS; ActivityID2, START_TS; ActivityID3, START_TS). Such activity data recorded onto the object ring-buffer 210 may be stored in the object file 216. Such object file 216 may also include activity start times, activity end times, an activity ID, activity results, activity types (e.g., competitive match, quest, task, etc.), user or peer data related to the activity. For example, an object file 216 may store data regarding an item used during the activity. Such object file 216 may be stored on the object server 226, though the object file 216 may be stored on any server, a cloud server, any console 228, or any user device 130.

Such object data (e.g., the object file 216) may be associated with the content data (e.g., the media file 212 and/or the content time stamp file 214). In one example, the UGC server 232 stores and associates the content time stamp file 214 with the object file 216 based on a match between the streaming ID of the content time stamp file 214 and a corresponding activity ID of the object file 216. In another example, the object server 226 may store the object file 216 and may receive a query from the UGC server 232 for an object file 216. Such query may be executed by searching for an activity ID of an object file 216 that matches a streaming ID of a content time stamp file 214 transmitted with the query. In yet another example, a query of stored content time stamp files 214 may be executed by matching a start time and end time of a content time stamp file 214 with a start time and end time of a corresponding object file 216 transmitted with the query. Such object file 216 may also be associated with the matched content time stamp file 214 by the UGC server 232, though the association may be performed by any server, a cloud server, any console 228, or any user device 130. In another example, an object file 216 and a content time stamp file 214 may be associated by the console 228 during creation of each file 216, 214.

Figure 3:
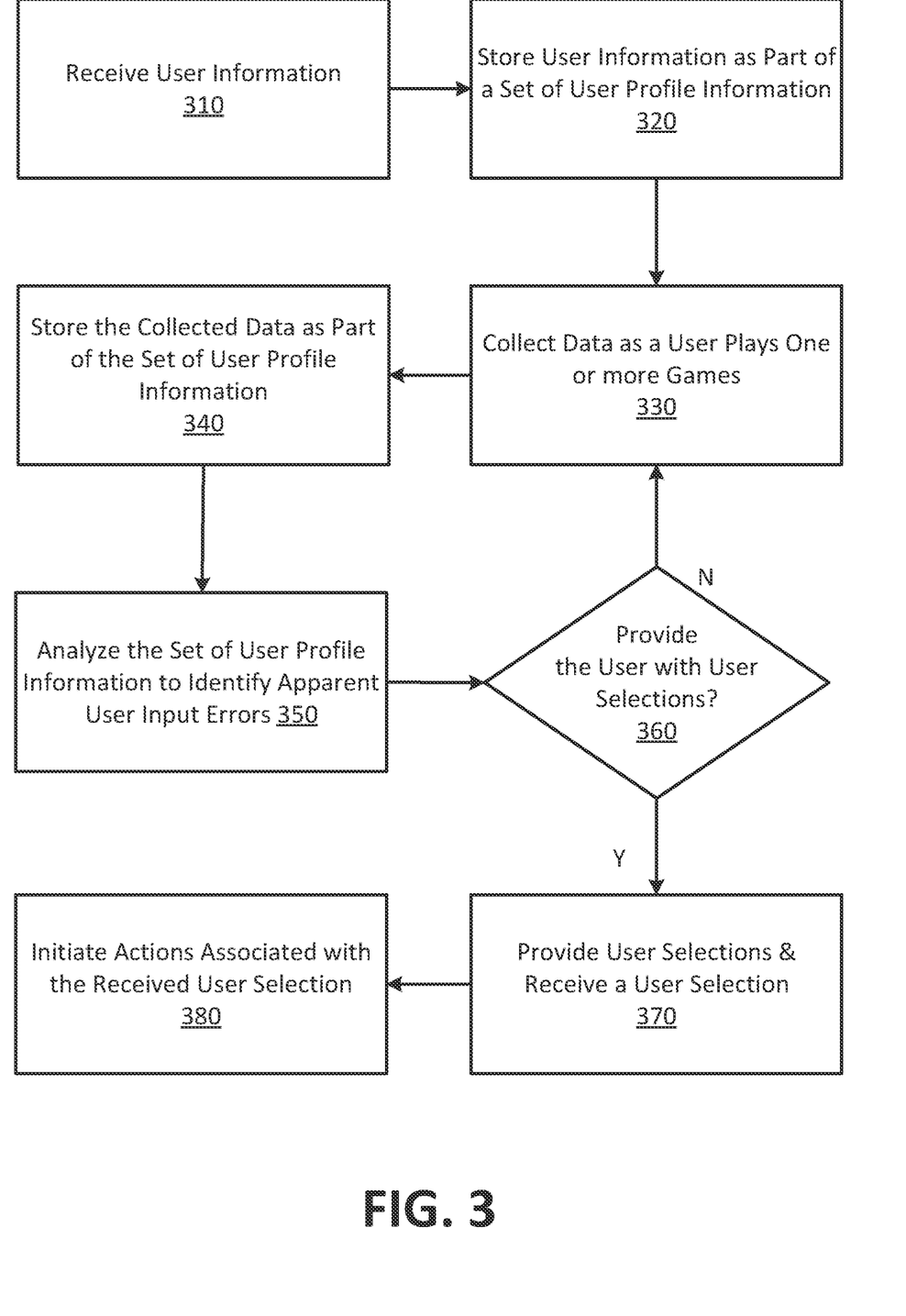
FIG. 3 is a flowchart illustrating an exemplary method for profile-based detection of unintended controller usage.

FIG. 3 is a flowchart illustrating an exemplary method for profile-based detection of unintended controller usage. FIG. 3 begins with step 310 where a set of user information may be received. This user information may uniquely identify a user and may include a username and/or login information. Next in step 320 this user information may be stored as part of a set of user profile information and then data may be collected as the user plays one or more games in step 330. Step 330 may also include monitoring and collecting metrics associated with game performance. This collected data may then be stored in step 340 and analyzed in step 350. The data collected in step 330 may include metrics that correspond to a negative gaming outcome (e.g. a user missing a target in a first-player shooter game), control buttons depressed by the user that may be associated with the negative gaming outcome, and timing information. This timing information may be used to cross-reference a time of a gaming event with a timing of a negative gaming outcome when the analysis is performed. For example, a time when a user misses a target may correspond to a time when a character of the user is shot may be separated by several seconds. Here the negative gaming outcome could be the user's character being shot by another gaming character after the user's character missed a shot apparently aimed at the other gaming character. A set of profile data may identify a game or type of game that a user has played and metrics associated with the user playing different types of games may be used to identify types of games that a user plays well and types of games that the performance of the user's game play could possibly be improved. This information itself could help an artificial intelligent (AI) system or machine learning (ML) algorithm identify how he user may improve their game play.

The profile data may be analyzed in step 350 and this analysis may identify apparent errors made by the user. Such an error may include a user may inadvertently pressing an incorrect controller button when playing a game. Determination step 360 may then identify whether the user should be provided with a set of selections. This may include identifying whether the user consistently makes a same apparent error or makes a same apparent error more than a threshold percentage of times. When determination step 360 identifies that the selections should not be provided to the user, program flow may move to back to step 330 where additional user data is collected.

When determination step 360 identifies that the selections should be provided to the user, those selections may be provided to the user and a user selection may be received in step 370. Such user selections may allow a user to select one or more activities that help train a user or that may be used to adapt controller functionality specifically for that particular user. One user selection may include "target practice" where the user may be provided with sets of targets or targets that move at different speeds. Such practice sessions may help the user become more adept at playing the game. In an instance when the game is a driving game and an apparent error corresponds to over steering, a user may be provided with instructions that inform the user to more gently use a control button associated with steering a vehicle in a game. After a user makes a selection, actions associated with that selection may be initiated in step 380.

In certain instances, the user may be provided with selections that help identify whether the game that the user is playing should be changed. For example, movements of other characters may be slowed down to allow the user more time to target these other characters. Such changes may include changing a sensitivity of a steering function. A controller button may be made less sensitive when making an over steering of a vehicle less likely. As such, user selections may allow a user to change the tempo of a game or sensitivity of a gaming button to allow the user to have more fun playing the game. This could help prevent the user from becoming frustrated with a particular game or type of game.

Other selections made by a user may help artificial intelligent software identify whether the user has an impairment. In an instance when it appears that the user has a disabled index finger, that user may be instructed to use their middle finger to actuate a particular gaming control button (e.g. a trigger).

Figure 4:
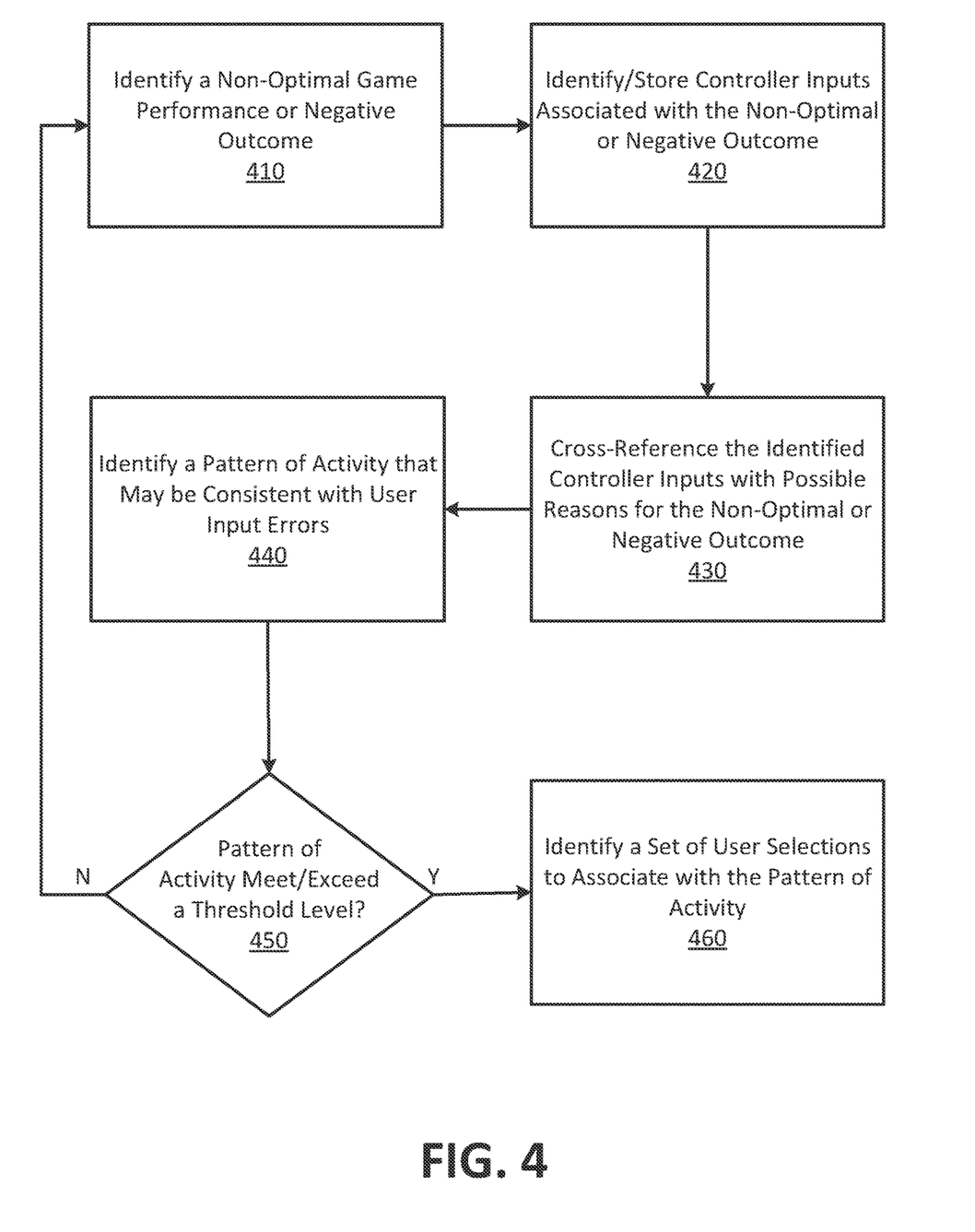
FIG. 4 is a flowchart illustrating an alternative method for profile-based detection of unintended controller usage.

FIG. 4 is a flowchart illustrating an alternative method for profile-based detection of unintended controller usage. FIG. 4 begins with step 410 where a non-optimal game performance or a negative game outcome is identified. Here again this could include identifying that after missing a target, that the user's character was shot because of that miss or this negative outcome could be associated with the user over steering the vehicle they were driving when playing the game.

Next in step 420, controller inputs provided by the user may be reviewed to identify controller inputs that may be associated with the non-optimal gaming performance or the negative gaming outcome. Next in step 430 the identified controller inputs may be cross-referenced with possible reasons for the non-optimal gaming performance or negative outcome. A pattern of activity may then be identified in step 440 of FIG. 4 and metrics associated with that pattern of activity may be evaluated to see whether the pattern meets or exceeds a threshold level. This may include calculating percentages. For example, such percentages could be a function of a total number of shots versus a number of missed shots. This may include identifying that a user more often presses an incorrect button when performing a gaming function (e.g. the user selects a braking function instead of an acceleration function or visa versa). Other patterns may relate to consistently oversteering a vehicle or understeering the vehicle when playing a game. When determination step 450 identifies that the threshold level has not been met, program flow may move back to step 410 where additional gaming data is evaluated to identify a non-optimal gaming performance or negative gaming outcome. When determination step 450 identifies that the threshold level has been met, program flow may move to step 460 where a set of selections that could be provide to a user are identified as discussed in respect to FIG. 3.

Figure 5:
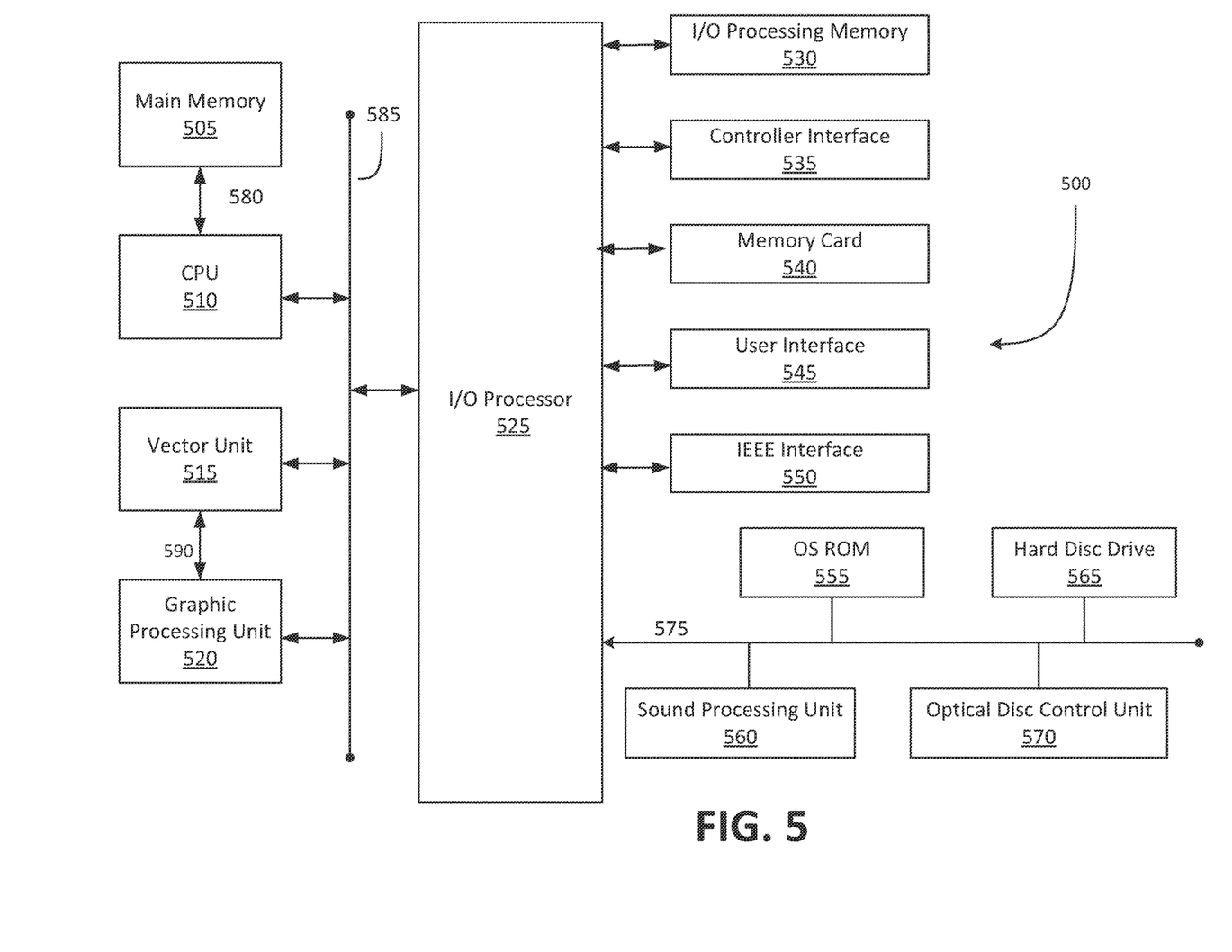
FIG. 5 is a block diagram of an exemplary electronic entertainment system that may be used in embodiments of the present invention.

FIG. 5 is a block diagram of an exemplary electronic entertainment system 500. The entertainment system 500 of FIG. 5 includes a main memory 505, a central processing unit (CPU) 510, vector unit 58, a graphics processing unit 520, an input/output (I/O) processor 525, an I/O processor memory 530, a controller interface 535, a memory card 540, a Universal Serial Bus (USB) interface 545, and an IEEE interface 550. The entertainment system 500 further includes an operating system read-only memory (OS ROM) 555, a sound processing unit 560, an optical disc control unit 570, and a hard disc drive 565, which are connected via a bus 575 to the I/O processor 525.

Entertainment system 500 may be an electronic game console. Alternatively, the entertainment system 500 may be implemented as a general-purpose computer, a set-top box, a hand-held game device, a tablet computing device, or a mobile computing device or phone. Entertainment systems may contain more or less operating components depending on a particular form factor, purpose, or design.

The CPU 510, the vector unit 58, the graphics processing unit 520, and the I/O processor 525 of FIG. 5 communicate via a system bus 585. Further, the CPU 510 of FIG. 5 communicates with the main memory 505 via a dedicated bus 580, while the vector unit 58 and the graphics processing unit 520 may communicate through a dedicated bus 590. The CPU 510 of FIG. 5 executes programs stored in the OS ROM 555 and the main memory 505. The main memory 505 of FIG. 5 may contain pre-stored programs and programs transferred through the I/O Processor 525 from a CD-ROM, DVD-ROM, or other optical disc (not shown) using the optical disc control unit 570. I/O Processor 525 of FIG. 5 may also allow for the introduction of content transferred over a wireless or other communications network (e.g., 4$, LTE, 3G, and so forth). The I/O processor 525 of FIG. 5 primarily controls data exchanges between the various devices of the entertainment system 500 including the CPU 510, the vector unit 58, the graphics processing unit 520, and the controller interface 535.

The graphics processing unit 520 of FIG. 5 executes graphics instructions received from the CPU 510 and the vector unit 58 to produce images for display on a display device (not shown). For example, the vector unit 58 of FIG. 5 may transform objects from three-dimensional coordinates to two-dimensional coordinates, and send the two-dimensional coordinates to the graphics processing unit 520. Furthermore, the sound processing unit 560 executes instructions to produce sound signals that are outputted to an audio device such as speakers (not shown). Other devices may be connected to the entertainment system 500 via the USB interface 545, and the IEEE 1394 interface 550 such as wireless transceivers, which may also be embedded in the system 500 or as a part of some other component such as a processor.

A user of the entertainment system 500 of FIG. 5 provides instructions via the controller interface 535 to the CPU 510. For example, the user may instruct the CPU 510 to store certain game information on the memory card 540 or other non-transitory computer-readable storage media or instruct a character in a game to perform some specified action.

The present invention may be implemented in an application that may be operable by a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for profile-based detection of unintended controller usage, the method comprising:
storing in memory a set of input data received at an interactive controller, the set of input data including timing information associated with one or more virtual actions taken within a virtual environment resulting from one or more controller inputs received via the interactive controller;
monitoring performance data associated with a user during a current interactive session associated with the virtual environment, wherein the monitored performance data includes a current set of input data at an identified time within the virtual environment;
identifying that the current set of input data is associated with an unintended virtual action based on an analysis that compares the current set of input data at the identified time to the stored set of input data at a corresponding time within the virtual environment, wherein the stored set of input data is associated with a different virtual action identified as intended;
identifying a set of selectable options to present the user based on the unintended virtual action, wherein one or more of the selectable options is based on the intended virtual action associated with the stored set of input data;
generating at least one of the set of selectable options to present to the user via a user device associated with the virtual environment, wherein the user makes a selection from the set of selectable options; and
initiating an action corresponding to the selection, wherein the action is initiated within the virtual environment in accordance with the selection.

2. The method of claim 1, wherein initiating the action includes providing training information regarding the intended virtual action, wherein the training information includes instructions regarding one or more controller inputs associated with performing the intended virtual action in the virtual environment.

3. The method of claim 1, further comprising cross-referencing the stored set of input data with a first metric that corresponds to the unintended virtual action and a second metric that corresponds to the identified time associated with the unintended virtual action.

4. The method of claim 1, further comprising storing user profile data regarding the user that cross-references the performance data of the current interactive session with the stored set of input data and with a content title associated with the current interactive session.

5. The method of claim 4, further comprising updating the user profile data with information that cross-references performance data of a plurality of interactive sessions with one or more respective sets of input data and with one or more content titles associated with the plurality of interactive sessions.

6. The method of claim 5, further comprising identifying that the user makes more unintended virtual actions when playing a first type of the content titles as compared to a second type of the content titles.

7. The method of claim 1, wherein monitoring the performance data associated with the user includes tracking a plurality of conditions associated with the current interactive session, and further comprising identifying one or more patterns each correlating a set of the conditions with occurrence of unintended virtual actions.

8. The method of claim 1, wherein initiating the action includes reversing or negating the unintended virtual action and automatically performing the intended virtual action within the virtual environment.

9. The method of claim 1, wherein initiating the action includes changing a timing or pacing of one or more events within the current interactive session.

10. The method of claim 1, wherein initiating the action includes changing a button mapping of a same or different controller of the user, and wherein the changed button mapping allows for a different set of controller inputs to result in performance of the intended action within the virtual environment.

11. A system for profile-based detection of unintended controller usage, the system comprising:
- memory that stores a set of input data received at an interactive controller, the set of input data including timing information associated with one or more virtual actions taken within a virtual environment resulting from one or more controller inputs received via the interactive controller;
- a communication interface that receives monitored performance data associated with a user during a current interactive session associated with the virtual environment, wherein the monitored performance data includes a current set of input data at an identified time within the virtual environment; and
- a processor that executes instructions stored in memory, wherein the processor executes the instructions to:
  - identify that the current set of input data is associated with an unintended virtual action based on an analysis that compares the current set of input data at the identified time to the stored set of input data at a corresponding time within the virtual environment, wherein the stored set of input data is associated with a different virtual action identified as intended;
  - identify a set of selectable options to present the user based on the unintended virtual action, wherein one or more of the selectable options is based on the intended virtual action associated with the stored set of input data;
  - generate at least one of the set of selectable options to present to the user via a user device associated with the virtual environment, wherein the user makes a selection from the set of selectable options; and
  - initiate an action corresponding to the selection, wherein the action is initiated within the virtual environment in accordance with the selection.

12. The system of claim 11, wherein the processor initiates the action by providing training information regarding the intended virtual action, wherein the training information includes instructions regarding one or more controller inputs associated with performing the intended virtual action in the virtual environment.

13. The system of claim 11, wherein the processor executes further instructions to cross-reference the stored set of input data with a first metric that corresponds to the unintended virtual action and a second metric that corresponds to the identified time associated with the unintended virtual action.

14. The system of claim 11, wherein the memory further stores user profile data regarding the user that cross-references the performance data of the current interactive session with the stored set of input data and with a content title associated with the current interactive session.

15. The system of claim 14, wherein the processor executes further instructions to update the user profile data with information that cross-references performance data of a plurality of interactive sessions with one or more respective sets of input data and with one or more content titles associated with the plurality of interactive sessions.

16. The system of claim 15, wherein the processor executes further instructions to identify that the user makes more unintended virtual actions when playing a first type of the content titles as compared to a second type of the content titles.

17. The system of claim 11, wherein the processor monitors the performance data associated with the user by further tracking a plurality of conditions associated with the current interactive session, and wherein the processor executes further instructions to identify one or more patterns each correlating a set of the conditions with occurrence of unintended virtual actions.

18. The system of claim 11, wherein the processor initiates the action by reversing or negating the unintended virtual action and automatically performing the intended virtual action within the virtual environment.

19. The system of claim 11, wherein the processor initiates the action by changing a timing or pacing of one or more events within the current interactive session.

20. The system of claim 11, wherein the processor initiates the action by changing a button mapping of a same or different controller of the user, and wherein the changed button mapping allows for a different set of controller inputs to result in performance of the intended action within the virtual environment.

21. A non-transitory computer-readable storage medium having embodied thereon a program executable by a processor for implementing a method for profile-based detection of unintended controller usage, the method comprising:
- storing in memory a set of input data received at an interactive controller, the set of input data including timing information associated with one or more virtual actions taken within a virtual environment resulting from one or more controller inputs received via the interactive controller;
- monitoring performance data associated with a user during a current interactive session associated with the virtual environment, wherein the monitored performance data includes a current set of input data at an identified time within the virtual environment;
- identifying that the current set of input data is associated with an unintended virtual action based on an analysis that compares the current set of input data at the identified time to the stored set of input data at a corresponding time within the virtual environment, wherein the stored set of input data is associated with a different virtual action identified as intended;
- identifying a set of selectable options to present the user based on the unintended virtual action, wherein one or more of the selectable options is based on the intended virtual action associated with the stored set of input data;
- generating at least one of the set of selectable options to present to the user via a user device associated with the virtual environment, wherein the user makes a selection from the set of selectable options; and
- initiating an action corresponding to the selection, wherein the action is initiated within the virtual environment in accordance with the selection.

* * * * *